United States Patent
Baeza-Yates et al.

(10) Patent No.: US 7,890,488 B2
(45) Date of Patent: Feb. 15, 2011

(54) SYSTEM AND METHOD FOR CACHING POSTING LISTS

(75) Inventors: Ricardo Baeza-Yates, Barcelona (ES); Aristides Gionis, Barcelona (ES); Flavio Junqueira, Barcelona (ES); Vassilis Plachouras, Barcelona (ES)

(73) Assignee: Yahoo! Inc., Sunnyvale, CA (US)

( * ) Notice: Subject to any disclaimer, the term of this patent is extended or adjusted under 35 U.S.C. 154(b) by 583 days.

(21) Appl. No.: 11/868,383

(22) Filed: Oct. 5, 2007

(65) Prior Publication Data

US 2009/0094416 A1     Apr. 9, 2009

(51) Int. Cl.
*G06F 7/00* (2006.01)
*G06F 17/30* (2006.01)

(52) U.S. Cl. .................... 707/706; 707/802
(58) Field of Classification Search .............. 707/101, 707/706, 802
See application file for complete search history.

(56) References Cited

U.S. PATENT DOCUMENTS 7,533,245 B2 * 5/2009 Frieder et al. ............... 712/32

OTHER PUBLICATIONS

Luu et al.: "Using Highly Discriminative Keys for Indexing in a Peer-to-Peer Full-Text Retrieval System", EPFL, School of Computer and Communication Sciences, Lausanne, Switzerland, Jul. 6, 2005.*

Tatikonda et al.: "On Efficient Posting List Interseaction with Multicore Processors", SIGIR '09, Jul. 19-23, 2009, Boston, MA., U.S.A. (ACM 978-1-60558-483-6/09/07).*

Vo Ngoc Anh et al., "Pruned Query Evaluation Using Pre-Computed Impacts," Computer Science and Software Engineering, The University of Melbourne, Victoria 3010, Austrailia; SIGIR '06, Aug. 6-11, 2006, Seattle, Washington, USA, Copyright 2006, ACM 1-59593-369-7/06/0008, pp. 372-379.

Stefan Bütcher et al., "A Document-Centric Approach to Static Index Pruning in Text Retrieval Systems, " School of Computer Science, University of Waterloo, Canada; CIKM '06, Nov. 5-11, 2006, Arlington, Virginia, USA, Copyright 2006 ACM 1-59593-433-2/06/0011, pp. 1-8.

Paolo Boldi et al., "UbiCrawler: a scalable fully distributed Web crawler," Department of Computer Science, The University of Iowa, 14 Maclean Hall, Iowa City IA 52240, USA, Published online Mar. 24, 2004, Copyright 2004; John Wiley & Sons, Ltd., pp. 711-726.

(Continued)

*Primary Examiner*—Kuen S Lu
(74) *Attorney, Agent, or Firm*—Hickman Palermo Truong & Becker LLP

(57) ABSTRACT

A method of caching posting lists to a search engine cache calculates the ratios between the frequencies of the query terms in a past query log and the sizes of the posting lists for each term, and uses these ratios to determine which posting lists should be cached by sorting the ratios in decreasing order and storing to the cache those posting lists corresponding to the highest ratio values. Further, a method of finding an optimal allocation between two parts of a search engine cache evaluates a past query stream based on a relationship between various properties of the stream and the total size of the cache, and uses this information to determine the respective sizes of both parts of the cache.

10 Claims, 1 Drawing Sheet

OTHER PUBLICATIONS

Figure 1:
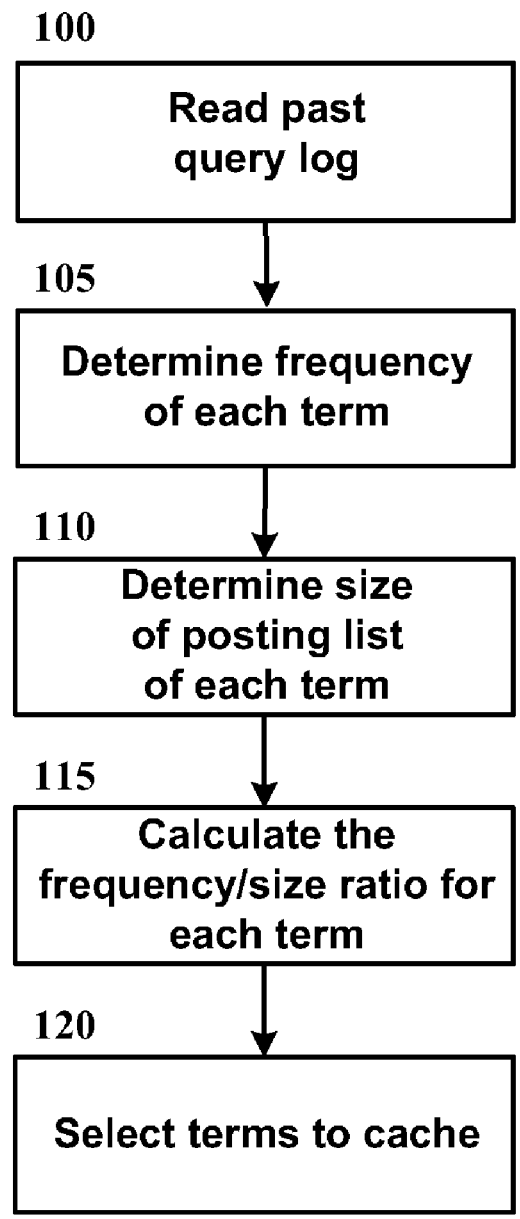

Chris Buckley et al., "Optimization of Inverted Vector Searches," Department of Computer Science, Cornell University, Ithaca, New York 14853, College of the Virgin Islands, Box 84, Kingshill, St. Croix, Virgin Islands 00850; Copyright 1985 ACM 0-89791-159-8/85/006/0097, pp. 97-110.

Ricardo Baeza-Yates et al., "A Three Level Search Engine Index Based in Query Log Distribution," Center for Web Research, Department of Computer Science, Universidad de Chile, Blanco Encalada 2120, Santiago, Chile; M.A. Nascimento, E.S. de Moura, A.L. Oliveira (Eds.): SPIRE 2003, LNCS 2857, Copyright Springer-Verlag Berlin Heidelberg 2003; pp. 56-65.

Pei Cao et al., "Cost-Aware WWW Proxy Caching Algorithms," USENIX, Proceedings of the USENIX Symposium on Internet Technologies and Systems, Monterey, California, Dec. 1997, pp. 1-14.

Tiziano Fagni et al., "Boosting the Performance of Web Search Engines: Caching and Prefetching Query Results by Exploiting Historical Usage Data," Copyright ACM Transactions on Information Systems, vol. 24, No. 1, Jan. 2006, pp. 51-78.

Ronny Lempel et al., "Predictive Caching and Prefetching of Query Results in Search Engines," Science The Technion, Haifa 32000, Israel; Copyright WWW 2003, May 20-24, 2003, Budapest, Hungary, ACM 1-58113-680-03/03/0005, pp. 19-28.

Xiaohui Long et al., "Three-Level Caching for Efficient Query Processing in Large Web Search Engines," CIS Department, Polytechnic University, Brooklyn, NY 11201, Copyright is held by the International World Wide Web Conference Committee (IW3C2), WWW 2005, May 10-14, 2005, Chiba, Japan, ACM 1-59593-046-9/05/0005, pp. 1-10.

E.P. Markatos, "On caching search engine query results," Institute of Computer Science (ICS), Foundation for Research & Technology—Hellas (FORTH), P.O. Box 1385, Heraklion, Crete, GR-711-10 Greece, also University of Crete, 0140-3664/01, Copyright 2001 Elsevier Science B.V., PII: S0140-3664(00)00308-X, pp. 137-143.

Iadh Ounis et al., "Terrier: A High Performance and Scalable Information Retrieval Platform," Department of Computing Science, University of Glasgow, Scotland, UK, Copyright SIFIR Open Source Workshop '06 Seattle, Washington, USA, pp. 1-7.

Vijay V. Raghavan et al., "On the Reuse of Past Optimal Queries," The Center for Advanced Computer Studies, University of Southwestern Louisiana, Lafayette, LA 70504, USA; The Department of Computer Science, University of Southwestern Louisiana, Lafayette, LA 70504, USA; SIGIR '95 Seattle WA, USA; Copyright 1995, ACM 0-89791-714-6/95/07, pp. 344-350.

Patricia Correia Saraiva et al., "Rank-Preserving Two-Level Caching for Scalable Search Engines," Federal Univ. of Minas Gerais, Belo Horizonte, Brazil, Akwan Information Technologies, Belo Horizonte, Brazil, Federal Univ. of Amazonas, Manaus, Brazil, SIGIR '01, Sep. 9-12, 2001, New Orleans, Louisiana, USA; Copyright 2001 ACM 1-58113-331-6/01/0009, pp. 51-58.

Trevor Strohman et al., "Optimization Strategies for Complex Queries," Center for Intelligent Information Retrieval, Department of Computer Science, University of Massachusetts, Amherst, MA 01003, Cogitech, Jackson Hole, WY 83001, SIGIR '05, Aug. 15-19, 2005, Salvador, Brazil; Copyright 2005 ACM 1-59593-034-5/05/0008, pp. 1-7.

N.E. Young, "On-Line File Caching," Algorithmica (2002) 33: 371-383, DOI: 10.1007/s00453-001-0124-5, Algorithmica Copyright 2002 Springer-Verlag New York Inc., Received Nov. 10, 1999; revised Mar. 20, 2001, Communicated by M. Goodrich, Online publication Mar. 25, 2002, pp. 371-383.

Ian H. Witten et al., "Managing Gigabytes—Compressing and Indexing Documents and Images," Morgan Kaufmann Publishers, Inc., 340 Pine Street, Sixth Floor, San Francisco, California, 94104-3205, USA, Copyright 1999; pp. 114-127.

* cited by examiner

US 7,890,488 B2

SYSTEM AND METHOD FOR CACHING POSTING LISTS

BACKGROUND

1. Field of the Invention

Aspects of the present invention relate generally to selecting which posting lists should be stored to a static search engine cache.

2. Description of Related Art

As is known in the art, search engines enable users to find content available through a wide variety of mediums and protocols, such as, for example, the Internet and the Hypertext Transfer Protocol (HTTP), etc. On a regular basis, the majority of Internet users submit search queries to search engines when looking for specific content on the Internet. Given the large number of users routinely searching for content, the large volume of data required to enable useful results, and the high processing requirements of such a search engine system, efficient mechanisms are needed to enable search engines to respond to the queries as quickly and as efficiently as possible.

One mechanism for increasing the efficiency of processing search engine queries is a cache, which can maintain, in some medium, the results of frequently or recently submitted queries. Generally, a cache allocates a fixed, pre-determined amount of memory space for storing previously processed search queries. If a search engine then receives a query that it has already processed and stored in the cache, the results may be returned without having to re-process the query; such an action is known as a "hit" (the performance of a cache is generally measured in terms of "hit ratio," which is the number of hits divided by the total number of queries). If a search engine receives a query that it has not already processed, or, more specifically, that it has not already processed and saved to the cache (a "miss"), then it processes the query and [potentially] saves the results to the cache. If the cache is full when new results need to be saved to it, an eviction policy may be employed to determine what, if anything, will be removed from the cache so that room can be made for the new results.

Generally, a cache holds either the results of a particular query or the posting lists associated with a given query. Returning a result to a query that already exists in the cache is generally more efficient than computing the result using cached posting lists. Relatedly, previously unseen queries generally occur more often than previously unseen terms, resulting in a lower hit rate for cached results.

Thus, it would be desirable to divide the cache into a first part for caching query results and a second part for caching posting lists. It also would be desirable to determine which terms to cache in the posting lists section of the cache, where the method takes into account both the frequency of the query terms and the size of the associated posting list.

SUMMARY

In light of the foregoing, it is a general object of the invention to combine the frequency of query terms with the size of the associated posting lists to determine which query terms to cache, thereby improving on previous methods that do not take into account the size of the posting lists.

It is another object of the invention to determine, in a two-part cache, how much space should be allocated to each part.

BRIEF DESCRIPTION OF THE DRAWING FIGURES

FIG. 1 is a logical flowchart illustrating the general process by which query terms are selected to have their posting lists cached.

DETAILED DESCRIPTION

Detailed descriptions of one or more embodiments of the invention follow, examples of which may be graphically illustrated in the drawing. Each example and embodiment is provided by way of explanation of the invention, and is not meant as a limitation of the invention. For example, features described as part of one embodiment may be utilized with another embodiment to yield still a further embodiment. It is intended that the present invention include these and other modifications and variations.

Aspects of the present invention are described below in the context of search engine caches, and more specifically, the caching of posting lists.

Throughout this disclosure reference is made to a "cache," which generally comprises a memory space and an implementation of a management policy; cache memories are limited in size, and so it is necessary to evict entries when the cache is full and there is a new entry that must be added. As understood by those of skill in the art, a search engine cache may be implemented through any of several media, such as, for example, Random-Access Memory (RAM), hard disks, hard disk arrays, etc. While the medium used is non-critical with respect to the invention, it will be appreciated by those of skill in the art that the methods described herein are applicable to all levels of the data-access hierarchy (e.g., memory/ disk layer, etc.). It also will be understood by those of skill in the art that a cache may span multiple disks, locations, etc.

Caches, as implemented by search engines, are generally described as being either "static" or "dynamic," which roughly correlates to when and how the cache is filled. A static cache is based on historical information and is periodically updated. The historical information may be informed by a query log, which maintains statistics about the frequency of query terms over a defined period. The decision as to what to cache in a static caching system may be considered as happening "offline" (i.e., it does not happen in real-time as new queries are received). Given that the most popular queries (i.e., those which occur most frequently) change infrequently, it is possible to keep track of them and make sure they are cached; the cache can periodically be brought up-to-date by re-calculating, offline, the most popular queries in the query log, on the assumption that query frequencies do not change much between the "learning" period (i.e., the period over which the queries in the query log are being examined), and the "deployment" period (i.e., when the cache is actively being used by the search engine). Deciding the optimal time period to update the cache depends on the available resources of the search engine and the dynamics of the query stream; thus, the time to update the cache may be optimized for a particular system and a particular workload. For example, a different cache may be used on weekends than is used on weekdays (where the weekend cache data has been computed from the query logs of previous weekends), etc.

Dynamic caching replaces cache entries according to the sequence of queries which the search engine receives, possibly in real time; when a new request arrives and the cache is full, the cache system decides, through an eviction policy, whether to evict some entry from the cache in the case of a cache miss (i.e., where the entry related to the current request does not exist in the cache). Such "online" decisions are based on a cache management policy, which can be configured in a number of different ways.

In addition to the two main types of caching systems (i.e., static and dynamic), there are generally two ways to use a cache, namely the caching of results and the caching of terms. Where the caching results method is used, the actual results returned for the particular query may be stored to the cache. For example, if a user searches for "blue socks," some or all of the found results may be cached. If, in the future, a user runs a search with the same query, and those results are still in the cache, the search engine does not need to re-run the search and, subsequently, can return the results more quickly.

Where the caching terms method is used, the posting lists of the query terms are written to the cache. Each posting list is a sequence of postings, or pairs of document identifiers and payload information. Document identifiers may be as simple as a Universal Resource Indicator (URI), or they can be an "internal" identifier as defined by the search engine, etc. In the simplest case, payload information may be empty, or may correspond to the particular term's frequency within the document. Payload information may also contain additional information such as pre-computed weights for terms, or "position" information; for example, in a Hypertext Markup Language (HTML) file, data between title tags may be given more weight than the same data between paragraph tags. When a new query is received, the search engine may use the posting lists to compute a retrieval score for each of the matched documents and form the set of results to the query. Generally, a search engine uses an inverted index, which consists of a posting list for each of the terms in the vocabulary, to match documents to queries; the inverted index provides fast access to the documents in which a term occurs.

Returning a result to a query that already exists in the cache is more efficient than computing the result using cached posting lists (i.e., less processing power is required because the actual results are stored and no real searching/matching needs to occur). Relatedly, previously unseen queries occur more often than previously unseen query terms, implying a higher miss rate for cached results. Due to the complexity in terms of efficiency and space, and the skewed distribution of the query stream, caching posting lists dynamically is not very efficient. Additionally, posting lists can be of widely varying sizes, further increasing their complexity. Static caching of posting lists poses even more challenges; the decision as to what terms to cache requires a trade-off between frequently queried terms and terms with small posting lists that are space-efficient.

In light of these issues, the present invention divides the cache memory into two parts, one for the caching of query terms, and one for the caching of posting lists, and provides an optimal method for choosing which posting lists to cache. Additionally, and in contravention to the art, the present invention uses a static cache for posting lists instead of a dynamic cache.

As is known in the art, dividing a cache into two parts is somewhat trivial, but deciding the optimal sizing of those parts is rather complex. In one embodiment, the two parts of the cache may operate independently of each other. For the caching of query results, either static or dynamic caching may be used. Where static caching is used, the queries to be cached may be the queries that appear most frequently in the query log of the search engine. If dynamic caching is used to cache query results, and if the cache is full when it has a new result to write to it, the cache must use an eviction policy to decide which stored result(s) will be removed from the cache in order to free memory space for the current result. Any eviction policy may be used, including those that are well known in the art, such as, for example, least recently used (i.e., the item(s) least recently accessed by the search engine is removed from the cache), least frequently used (i.e., the item(s) accessed by the search engine the fewest times over some period is removed from the cache), etc.

In one embodiment, posting lists are cached using static caching. An important benefit of a static cache is that it requires no eviction; thus, it can be more efficient when evaluating queries. However, if the characteristics of the query traffic change frequently over time, then it requires frequent re-population of the cache or there will be a significant impact on the hit rate (i.e., the incoming queries may result increasingly in misses). Cached terms in a static cache are cached "statically" and not in reaction to the current or most recent queries; if the whole index is larger than the available amount of cache memory, the challenge is to decide which terms to cache. Two important factors in this decision are the frequency of the query term and the size of its posting list. As discussed, the frequency can be computed by analyzing the search engine's query log to discover those terms most frequently a part of past queries. While posting lists have variable size, their size distribution generally follows a power law, and so it is beneficial for a caching policy to consider the size of posting lists as well as a term's frequency.

Ideally, it is desired to cache frequently-appearing terms as well as terms with small posting list sizes because they are space-efficient. It is possible to take into account both of the variables, size and frequency, by considering their ratios. The resultant ratios may be sorted in decreasing order, and the terms with the highest ratios may be chosen to be placed in the cache, until the cache is full. For example, let $f(t)$ denote the query-term frequency of a term t, that is, the number of queries containing t in the query log; and let $s(t)$ denote the document frequency of t, that is, the number of documents in the search engine's web-page collection in which the term t appears. It must be recognized that there is a trade-off between $f(t)$ and $s(t)$—terms with high $f(t)$ values are useful to keep in the cache because they are queried often, but terms with high $s(t)$ values are not good candidates because they correspond to long posting lists and can consume a substantial amount of space. In an effort to maximize the value of the cache (i.e., $f(t)$) while keeping the size of the posting lists stored in the cache (i.e., $s(t)$) as small as possible, the posting lists of the terms with the highest $f(t)/s(t)$ ratios are selected to be stored to the posting list cache.

Using such a ratio in a static cache to determine which posting lists to cache can provide a marked improvement (e.g., in terms of hit rate, etc.) over past efforts, including dynamic algorithms/caches, by selecting many more (and shorter) posting lists, even though they have smaller $f(t)$ values.

FIG. 1 is a logical flowchart illustrating the general process by which query terms are selected to have their posting lists cached. As illustrated at block 100, a query log is read and parsed by the cache system. From the query log, the cache system can deduce the frequency with which each query term appears over the relevant period, as shown at block 105. The size of the posting list for each query term may be computed from the search engine's web-page collection at block 110. As illustrated at block 115, the ratio between the frequency of each term (as determined at block 105) and the size of the posting list for each term (as determined at block 110) is calculated. The cache system then selects, at block 120, which terms to cache, by, for example, sorting the terms in decreasing order of their calculated ratios where the terms with the highest ratios are chose to be placed in the cache until the cache is full.

To decide initially whether it is preferable to cache query results or posting lists, two cases must be considered: (1) a cache that stores only pre-computed results and (2) a cache that stores only posting lists. To model these cases, and ultimately combine them, let M be the size of the cache, as measured in result units (i.e., the cache can store M query results), and let L, as measured in result units, represent the length of each posting list (assuming that the posting list length is the same for all terms). For case (1), $N_c$=M query results fit in the cache; and for case (2), $N_p$=M/L posting lists fit in the cache, thus $N_p$=$N_c$/L. While posting lists generally require more space, they can combine cached terms to evaluate more queries (or partial queries).

For case (1), assume that a query result in the cache can be evaluated in 1 time unit; for case (2), assume that if the posting lists of the terms of a query are in the cache, then the results can be computed in $TR_1$ time units, and if the posting lists are not in the cache, then the results can be computed in $TR_2$ time units (where $TR_2$>$TR_1$). To compare the time it takes to answer a stream of Q queries for case (1), let $V_c(N_c)$ be the volume of the most frequent $N_c$ queries. Thus, the overall time for case (1):

$$T_{c1}=V_c(N_c)+TR_2(Q-V_c(N_c)) \quad (1)$$

Similarly, for case (2), let $V_p(N_p)$ be the number of computable queries. Thus, the overall time for case (2):

$$T_{c2}=TR_1 V_p(N_p)+TR_2(Q-V_p(N_p)) \quad (2)$$

To check under which conditions $T_{c2}$<$T_{c1}$, equation (1) may be subtracted from equation (2):

$$T_{c2}-T_{c1}=(TR_2-1)V_c(N_c)-(TR_2-TR_1)V_p(N_p)>0 \quad (3)$$

Using equation (3) on a particular dataset may provide enough information to determine which type of cache (i.e., caching query results or posting lists) is better suited (i.e., more efficient, etc.) for that particular data. For example, it may be the case that caching query results saturates the cache more quickly and so there is no additional benefit from using more than a certain percentage of the index space for query results, etc. The results of such a calculation will depend on the data given to the equation.

Given that the query frequency distribution generally follows a power law with parameter $\alpha$>1, the i-th most frequent query appears with a probability proportional to $1/i^\alpha$. Therefore, the volume $V_c(n)$, which is the total number of the n most frequent queries, can be represented as:

$$V_c(n) = V_0 \sum_{i=1}^{n} \frac{Q}{i^\alpha} = \gamma_n Q \quad (0<y<1) \quad (4)$$

Based on experimental results, it is known that $V_p(n)$ generally grows faster than $V_c(n)$, and so the relation may be modeled as $V_p(n)=kV_c(n)^\beta$. Thus, in the worst case, for a large cache, $\beta \to 1$ (i.e., both techniques, case (1) and case (2), will cache a constant fraction of the overall query volume). In such an instance, where the cache is large, caching posting lists instead of query results may make sense only if:

$$\frac{L(TR_2-1)}{k(TR_2-TR_1)} > 1 \quad (5)$$

Where a small cache is involved, the transient behavior (i.e., where $\beta$>1) is more important; in this case there will always be a point where $T_{c2}$>$T_{c1}$ where the number of queries is large.

While the above equations are helpful in deciding which type of cache to use, realistically, a better strategy is to use both types (i.e., split the cache into two parts), namely a part for caching posting lists and a part for caching query results. In such a scenario, there will be some queries that can be answered by both parts of the cache; as the query results cache is faster (i.e., no real computation is required), it will be the first choice for answering the queries that might be answered by either part of the cache. To model such a split cache, let $Q_{Nc}$ be the set of queries that can be answered by the cached query results, and let $Q_{Np}$ be the set of queries that can be answered by the cached posting lists. Thus, the overall time required to compute the query sets using both parts of the cache may be evaluated through the following equation, where $N_p$=(M−$N_c$)/L:

$$T=V_c(N_c)+TR_1 V(Q_{Np}-Q_{Nc})+TR_2(Q-V(Q_{Np} \cup Q_{Nc})) \quad (6)$$

Deriving the optimal division of the cache between query results and posting lists is a difficult problem to solve analytically, however, simulations of particular implementations can be useful in realizing optimal cache trade-offs. One particular implementation may comprise a centralized caching system, where the caching mechanism may occur at a single level and be located in one particular machine. Another particular implementation may comprise a distributed caching system, where the caching mechanism may be located across multiple sites/machines. For example, the system may run on a cluster of machines (e.g., a broker machine, multiple query processors, etc.) interconnected through a network, such as, for example, a Local Access Network (LAN), a Wireless Access Network (WAN), etc. The broker may receive queries and broadcast them to the query processors, which may answer the queries and return the results to the broker; the broker may then merge the received answers and generate the final set of query results. Generally, the difference in response time between a centralized architecture and a distributed architecture is the extra communication between the broker and the query processors.

Simulations may be run against equation (6) to come up with the optimal trade-off between caching query results and caching posting lists. To model such simulations, it may help to define some of the required data; to that end, let M be the total available cache memory, out of which x units are used for caching query results and M−x units are used for caching posting lists. Using these values and equation (6), the average response time for a given dataset may be computed as a function of x. For the simulations, the cache may initially be filled with query results by using a part of a query log as training data, where results to the most frequent queries that can fit in space x are stored to the cache. Similarly, the rest of the cache may be used to store posting lists selected by a static caching algorithm (e.g., the algorithm discussed above that works by calculating the frequency/size ratio of each term), until the cache fills up.

The remaining variables from equation (6) may be defined in any of a number of ways according to the particular requirements of the system being simulated. For example, the values of $TR_1$ and $TR_2$ may correspond to the ratio between the average time it takes to evaluate a query and the average time it takes to return a stored query result for the same query; these values can obviously vary widely depending on the type of caching architecture being implemented (e.g., centralized, distributed, etc.), the type of disk-accesses required, etc. Once the variable values have been established, the simulation can run and the response time may be plotted as a function of x, which may ultimately be used to deduce the optimal size for each part of the cache. For example, the resultant data may show that 70% of the cache memory should be allocated for the caching of query results where the total amount of cache memory distributed over a WAN is split between a broker, which holds the cached query results, and query processors, which hold the cached posting lists. Such resultant data may also show that the difference between the configurations of the query processors is less important because the network communication overhead substantially increases the response time. It will be appreciated that such calculations largely depend on the particular configuration being simulated (e.g., the support of partial query evaluation, the use of compressed posting lists, etc.) and the associated query stream used to evaluate the configuration.

The sequence and numbering of blocks depicted in FIG. 1 is not intended to imply an order of operations to the exclusion of other possibilities. It will be appreciated by those of skill in the art that the foregoing systems and methods are susceptible of various modifications and alterations. For example, it may not always be the case that frequency determination (as shown at block 105) is carried out before determining the posting list size of each query term (as shown at block 110).

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A method comprising:
   determining, for each term of a plurality of query terms, a term frequency based on a number of queries that contain the term in a query log;
   determining, for each of the plurality of query terms, a posting list size; and
   calculating, for each of the plurality of query terms, a value corresponding to a relationship between the term frequency and the posting list size;
   for a particular term of the plurality of query terms, determining to store the posting list for the particular term in a cache of a search engine based on the value for the particular term;
   wherein the method is performed by one or more computing devices.

2. The method of claim 1 wherein the relationship is a ratio between the term frequency and the posting list size.

3. The method of claim 2 further comprising compiling a list of the calculated values, wherein the list is sorted in decreasing order of the calculated values.

4. The method of claim 3 further comprising storing a posting list corresponding to each of the plurality of query terms to the search engine cache according to the sorted list.

5. The method of claim 1 wherein the posting list size corresponds to the number of documents in the search engine's web-page collection that contain the query term.

6. The method of claim 1 wherein the term frequency is derived from a past query log.

7. A non-transitory computer-readable medium encoded with a computer-executable program, which, when executed by one or more computing devices, causes the one or more computing devices to perform:
   determining, for each term of a plurality of query terms, a term frequency based on a number of queries that contain the term in a query log;
   determining, for each of the plurality of query terms, a posting list size; and
   calculating, for each of the plurality of query terms, a value corresponding to a relationship between the term frequency and the posting list size;
   for a particular term of the plurality of query terms, determining to store the posting list for the particular term in a cache of a search engine based on the value for the particular term.

8. A non-transitory computer-readable medium as recited in claim 7, wherein the relationship is a ratio between the term frequency and the posting list size.

9. A non-transitory computer-readable medium as recited in claim 8, wherein the computer-executable program, when executed by the one or more computing devices, further causes the one or more computing devices to perform:
   compiling a list of the calculated values, wherein the list is sorted in decreasing order of the calculated values.

10. A non-transitory computer-readable medium as recited in claim 9, wherein the computer-executable program, when executed by the one or more computing devices, further causes the one or more computing devices to perform:
    storing a posting list corresponding to each of the plurality of query terms to the search engine cache according to the sorted list.

* * * * *